June 29, 1965 H. W. DYSON 3,191,872
DISINTEGRATING APPARATUS
Filed March 3, 1958 3 Sheets-Sheet 1

INVENTOR:
HOWARD W. DYSON
BY Howson & Howson ATTYS.

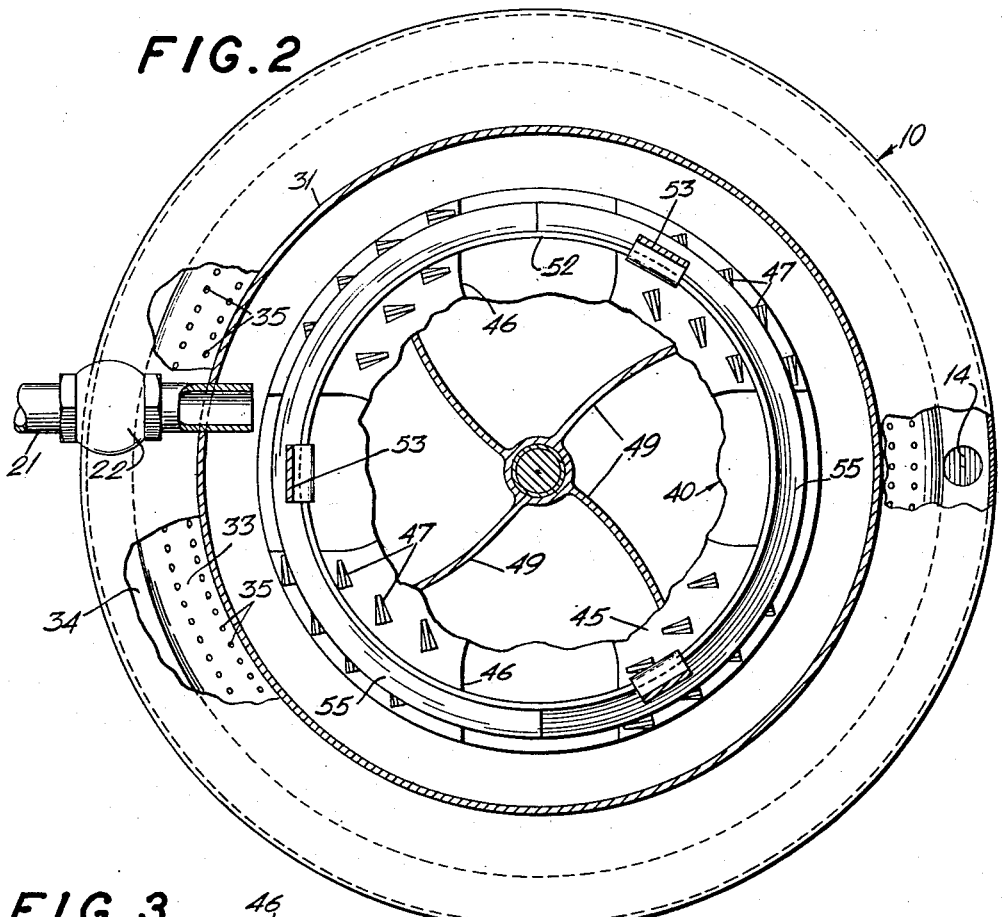
FIG.2
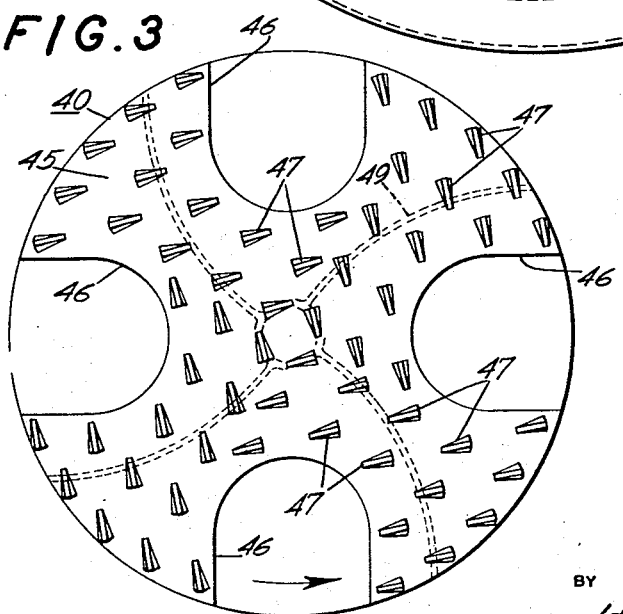
FIG.3
FIG.4
INVENTOR:
HOWARD W. DYSON

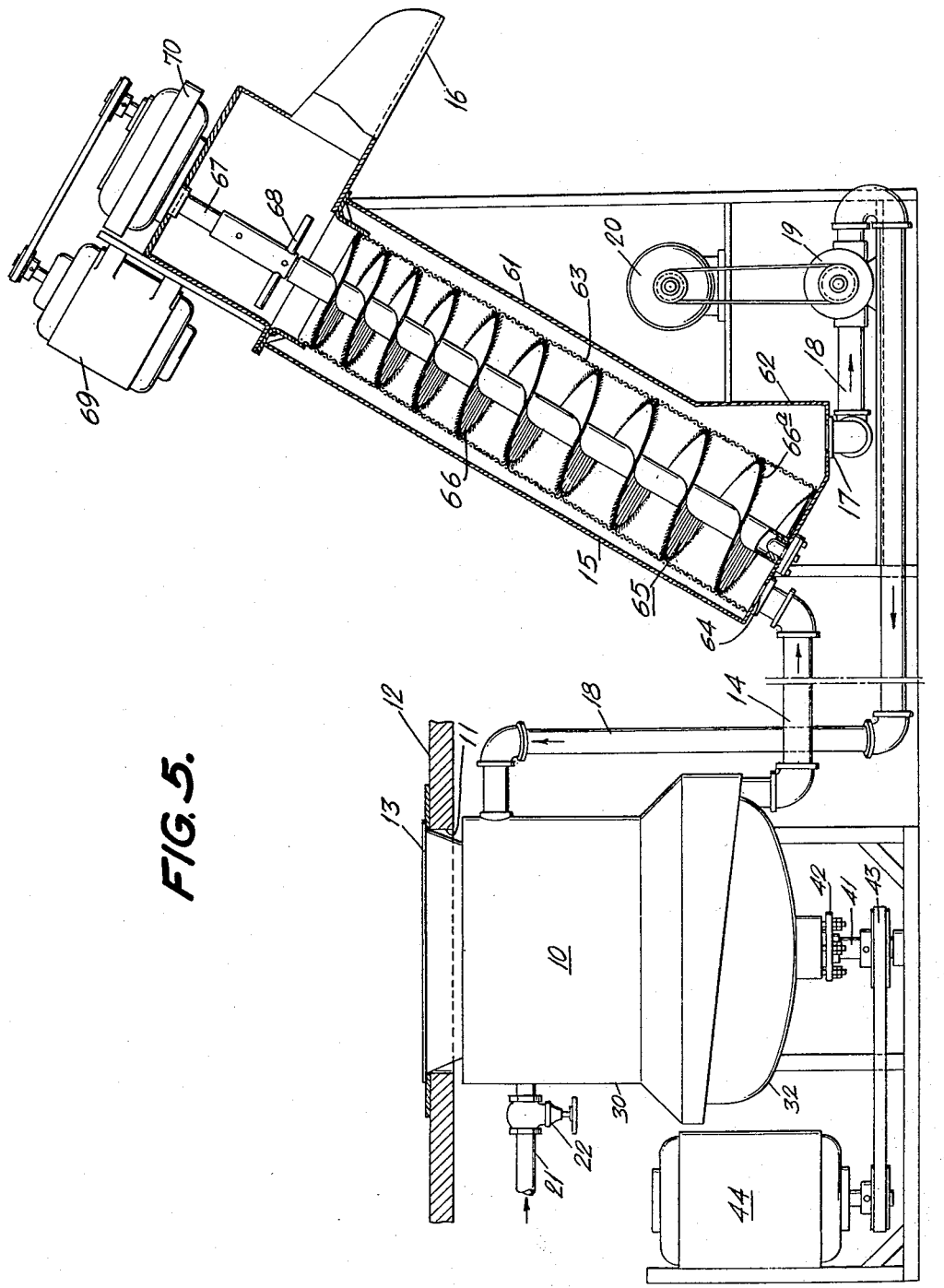

United States Patent Office 3,191,872
Patented June 29, 1965

3,191,872
DISINTEGRATING APPARATUS
Howard W. Dyson, 113 Bala Ave., Oreland, Pa.
Filed Mar. 3, 1958, Ser. No. 718,565
11 Claims. (Cl. 241—74)

The present invention relates to disintegrating apparatus and more particularly to a device which operates to disintegrate or comminute materials in the presence of water or other liquid to form a slurry which may be de-liquefied to form a pulp.

The apparatus operates to reduce or mix vegetable, animal, or mineral material and has particular utility to disintegrate or tear apart fibrous materials such s paper, pulp, asbestos, bark, garbage, compositions of these materials, etc. The apparatus also operates to reduce glass and other frangible materials to small particles for easy disposal. Other uses for the apparatus include the formation of suspensions and dispersions containing pulp or disintegrated material, and blending and mixing such materials with other fibrous or non-fibrous materials.

Prior apparatus for performing these functions was not satisfactory because of its limited capacity, high cost of operation, expense of purchase and maintenance, and lack of versatility and ability to handle a wide range of materials.

With the foregoing in mind, the present invention contemplates a novel disintegrating apparatus which has a high capacity and effectively disintegrates a wide range of materials and products.

More specifically, the present invention contemplates a disintegrating apparatus having a tank provided with an impeller disc operable to circulate the material and liquid through the tank and also to distintegrate and comminute the circulated material.

The invention also contemplates a tank having guide means for directing the circulating water therethrough and which also serves to deflect larger particles of material into engagement with the disintegrating member.

The present invention also provides a novel de-liquefier for the slurry from the tank which operates to remove a high percentage of the liquid from the slurry to form a semi-dry pulp.

More specifically, the novel de-liquefier of the present invention embodies a screw having a tapering outside diameter, and a pitch which decreases from the large end to the small end to provide improved liquid extraction properties.

The invention provides apparatus which is economical to manufacture, maintain, and use, and is fully effective to convert loose bulky material into a compact pulp.

All of the objects of the present invention and the various features and details of the construction and operation thereof are more fully set forth hereinafter with reference to the accompanying drawings in which:

FIG. 2 is a transverse sectional view taken along line 2—2 of FIG. 1;

FIG. 3 is a transverse sectional view taken along line 3—3 of FIG. 1 showing the disintegrating impeller disc of the present invention;

FIG. 4 is a detached perspective view of a tooth element of the disc shown in FIG. 3; and FIG. 5 is a view of apparatus made in accordance with the present invention showing the slurry-forming unit in elevation and the de-liquefying unit in section.

Figure 1:
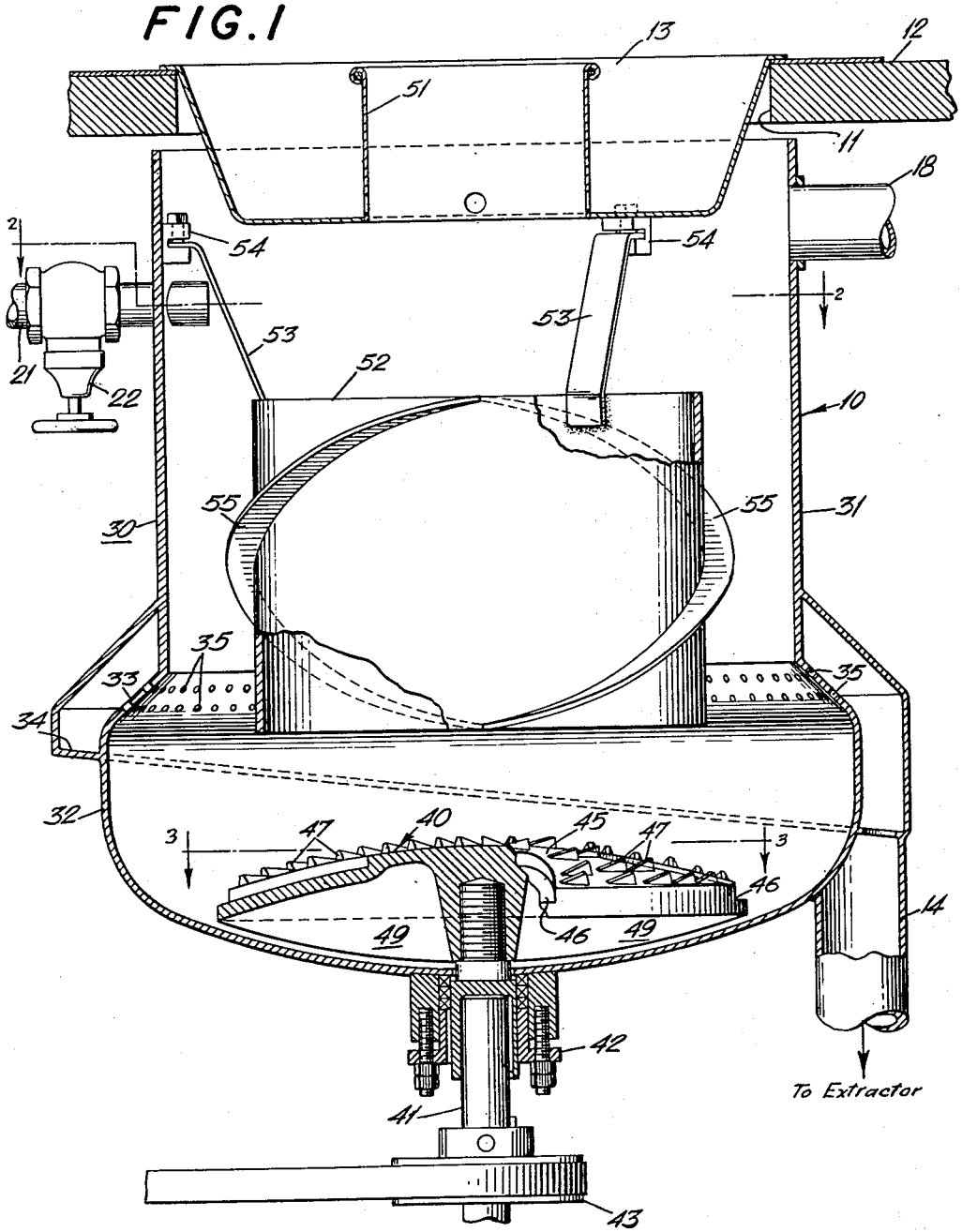
FIG. 1 is a vertical section through the slurry-forming unit of the present apparatus.

Referring now to the drawings and more particularly to FIG. 5, the apparatus comprises a slurry-forming device 10 which is open at its top to receive the material, for example through a hole 11 in a counter top 12 having a guard 13 therein. The device 10 forms a slurry which is transferred by means of a pipe 14 to a de-liquefying unit 15 which separates the liquid from the pulp in the slurry, discharging the pulp through a chute 16 and the liquid through a drain 17. The liquid is returned to the unit 10 through a pipe 18 by a pump 19 driven by a motor 20. Thus, the liquid is continuously recirculated through the slurry-forming device and the de-liquefying device, although a certain amount of the liquid is removed with the pulp through the chute 16. Make-up water is supplied by a pipe 21 controlled by a valve 22. For pulping paper and similar material, it has been found that simple tap water or river water may be used. For other uses, however, it may be desired to add bacteria or chemical additives for sterilization, enrichment or pH control.

Referring now to FIGS. 1–4, the slurry-forming unit comprises a tank having a general cylindrical upper portion and an enlarged cup-shaped lower portion 32 interconnected by a perforated shoulder section 33. A collecting trough 34 surrounds the perforated shoulder 33 to receive the slurry which passes through the perforations 35 of the shoulder 33 during the operation of the unit. The slurry is carried away from the trough 34 by the pipe 14. The pipe 14 carries the slurry to the de-liquefying unit which separates the pulp from the liquid in the slurry and returns the liquid to the unit 10 by the pipe 18. Make-up liquid to replenish the liquid removed with the pulp is supplied by the pipe 21 controlled by a valve 22. In the present instance, the valve 22 is hand-operated, but it is within the scope of the invention to provide automatic control for the valve to insure that the proper amount of water or other liquid is circulated through the tank.

A disintegrating and liquid-impelling disc is mounted in the cup-shaped portion 32 of the tank 30 to circulate that portion of the liquid in the tank which is not passed through the apertures 35 of the shoulder portion 33. To this end, the disc 40 is mounted on a shaft 41 projecting through the bottom of the tank and sealed therein by a suitable liquid seal 42. The shaft 41 is driven by means of belt and pulley 43 from motor 44 (see FIG. 5) mounted adjacent the unit 10.

The disc 40 is of hollow convex form with its convex surface 45 facing the cylindrical portion 31 of the tank 30. The convex surface has a radius of curvature approximately equal to the diameter of the disc, and is provided with recess 46 and plurality of projecting teeth or distintegrating elements 47, preferably arranged as shown in FIG. 3. Each tooth 47 is formed with its leading impact surface 48 substantially normal to the convex surface of the disc 40 and tapers toward the trailing edge as shown in FIG. 4. Thus, when the disc is rotating in the direction indicated by the arrow in FIG. 3, material falling upon the disc will impinge against the rapidly rotating impact surface 48 of the teeth and will be disintegrated or comminuted. The disc and teeth may be formed integrally, for example, by casting from a high-hardness steel or the like.

The rotary movement of the disc in the tank imparts a swirling motion to the liquid therein and forms a swirling mass which travels up the side of the cup-shaped portion 32 across the shoulder 33 and into the cylindrical portion 31. The cavity in the center of the mass overlies the toothed surface 45. The teeth on the disc 40 will effect the swirling motion to a slight degree, but it is preferred to form the disc 40 with vanes 49 on its concave under-side to substantially increase the swirling mass created by a rotation of the disc. As shown in FIG. 2, the vanes are generally arcuate with their convex surface constituting the leading surface of the vane as the disc is rotated. As shown in FIG. 1, the lower edge of the vanes 48 conform generally to the contour of the cup-shaped bottom 32 of the tank 30, and the outline in a vertical plane is substantially elliptical. The clearance between the outer periphery of the disc 40 and the bottom surface is sufficiently small to prevent large particles of non-disintegrated material from lodging under the disc and such particles are maintained in contact with the upper surface of the disc.

In the operation of the device, the material is introduced into the open upper end of the tank 30 through the aperture 11 in the counter top 12. The illustrated embodiment of the invention is designed for use in restaurants and the like wherein the counter top 12 is adjacent the dishwasher. The garbage and paper trash is deposited on the counter top and fed into the machine through the aperture 11. To prevent silverware or other reusable material from inadvertently entering the unit, a guard 13 is provided. The guard 13 comprises a dish-shaped member having a central upstanding tubular portion 51. As the trash and garbage is transferred manually from the counter top 12 into the tubular portion 51, heavier pieces such as silver and the like will drop out of the trash and fall into the space between the tubular portion 51 and the outer periphery of the member 13. Thus, the waste material only is introduced into the slurry-forming device 10 through the tubular portion 51.

The material drops down onto the disc 40 and is subjected to the impact and tearing action of the teeth. The teeth will tear, shred, or defiber the material and sling it outwardly within the swirling mass of liquid formed by the disc. If the particles are sufficiently small, they will pass through the apertures 35 into the collecting trough 34 along with a portion of the liquid, but the large particles will be carried by the swirling mass upwardly toward the cylindrical portion 31 and will fall down through the cavity in the center of mass of liquid onto the disc 40 where they are again subjected to the impact action of the teeth and are further disintegrated or comminuted.

Guide means is provided to assist the travel of the material upwardly in the swirling mass of liquid and to insure depositing of the material on the disc 40 before it is again caught into the swirling mass. To this end, a tubular guide element or barrel 52 is suspended in the tank coaxial with the cylindrical portion 31. The barrel forms a hollow swirling column of liquid above the swirling mass of liquid in the lower portion 32 and the bore of the column communicates with the cavity of the swirling mass which is enlarged to expose substantially the entire surface of the disc. Preferably, the barrel 52 is suspended by straps 53 mounted in the cylindrical portion 31 as indicated at 54. Lifter vanes 55 are provided on the exterior surface of the barrel 52. The lifting vanes 55 are helical in form and operate to assist the travel of the material upwardly in the swirling column created by the barrel 52. In addition, the downfalling material will be guided through the interior of the barrel 52 into engagement with the upper surface of the disc. In this manner, the barrel insures that the materials are subjected to the impact action by the teeth of the disc 40 before recirculating in the swirling mass of liquid. The barrel 52 also serves to prevent large pieces of material from being thrown out of the tank against the undersurface of the counter. Any pieces which are too large to pass between the barrel 52 and the cylindrical wall 31 will fall back or bounce back against the disc 40 where they will be disintegrated or comminuted into smaller pieces.

In the present embodiment of the invention, I have found that if a disc of 14″ diameter is rotated at a speed of 1750 r.p.m., a surface speed of 4500 feet per minute is produced at the outer periphery of the disc, and the material introduced through the tubular portion 51 is converted into a slurry in a very short time. Thus, the machine may operate continuously without danger of overloading.

The slurry expelled through the apertures 35 into the pipe 14 is then de-liquefied in the de-liquefying unit 15. Referring now to FIG. 5, the de-liquefier or extractor 15 comprises an elongated tubular casing, in the present instance mounted on an angle of approximately of 30° with the vertical. The casing 61 is provided with a collecting basin 62 which has a drain opening into the pipe 18. A generally cylindrical tubular screen 63 is mounted coaxially within the casing 61 and tapers upwardly as shown. The pipe 14 leads into the interior of the foraminous screen 63 which therefore separates the inlet opening from the pipe 14 from the drain 17.

A screw 65 is mounted on a shaft 67 for rotation in the casing 61 so that its outer periphery is in scraping engagement with the screen 63. To this end, the outer diameter of the screw tapers in conformity with the taper of the screen 63. As shown in FIG. 5, the shaft 67 is mounted for rotation at its upper and lower ends in the casing 61 and the screw 65 is formed by a helically-wound fin or scraper element 66 in engagement with the screen 63. If desired, the scraping action may be accomplished by mounting bristles 66a on the outer periphery of the fin 66. The bristles serve to clean the foramina of the screen. The pitch of the screw 65, or the spacing between adjacent convolutions of the scraper element 66 diminishes from the lower end toward the upper end of the screw.

The scraper element 66 of the screw terminates adjacent the upper end of the cylindrical portion of the casing 61 and beater elements 68 are mounted on the shaft 67 to engage the pulp advanced upwardly by the screw and break it up for discharge through the chute 16. The shaft 67 is driven from a suitable motor 69 through a gear reducer 70 of standard design.

In the operation of the de-liquefier or extractor 15, the slurry from the disintegrator unit 10 is introduced into the interior of the tubular screen 63. The rotation of the screw 65 advances the slurry upwardly and the excess liquid drains outwardly through the screen 63. In addition to the gravitational flow of liquid through the screen, the tapered form of the screen and the diminishing pitch of the screw compresses the slurry and squeezes out the liquid from the slurry so that a semi-dry pulp is discharged from the upper terminus of the screw similar to an extrusion. The semi-dry pulp is broken into pieces by the beater element 68 and discharged down the chute 16 where it is collected in a suitable receptacle. I have found that a screw which diminishes in outside diameter from 10″ to 7½″ over a distance over 24″, and operating at a speed of 60 r.p.m., produces a satisfactory disposable pulp. The pitch of the screw at the lower end may be 6″ and at the upper end of the screw 3″.

It is noted that the present invention provides a simple and effective apparatus for reducing bulky waste and garbage into a compact odorless form which is readily handled. The invention may also be used for reducing classified material to pulp.

In addition to handling waste material and garbage, the apparatus may be used in the disposal of raw sewage wherein the sludge is intermixed with the paper and garbage and is reduced to a pulp and thereafter aerated. The aerated pulp may be placed in a pile and composted for a suitable period, for example, twenty-one days, after which time, it may be used as an organic fertilizer.

The apparatus of the present invention may also be used to mix vegetable, animal or mineral materials as well as for reducing them to a pulp. The slurry forming unit 10 may be used to form suspensions and dispersions and to thoroughly blend and mix such materials with other materials. For example, the apparatus has utility in reducing solid pigments and/or chemicals to the desired size or particles and distributing the particles uniformly in the liquid medium in the manufacture of paints, varnishes, and the like.

Depending on the nature of the work desired, certain elements may be omitted. For example, when handling materials of substantially uniform small particle size, the barrel may be omitted. In addition, the impeller disc may be located differently, the guide vanes on the barrel may be omitted, and if it is desired to use the apparatus to batch operations, the perforated shoulder may be removed or the perforations may be closed. In the latter case, the machine would be operated for a predetermined period and emptied periodically when the material has attained the proper stage or state in the treatment.

While a particular embodiment of the present invention has been herein illustrated and described, it is not intended to limit the invention to such disclosure, but changes and modifications may be made therein and thereto within the scope of the following claims.

I claim:

1. A slurry-forming device comprising; a tank having a smoothly dished bottom, the inner portion of said bottom having slight upward curvature, gradually continued by sharper upward curvature of a major outer portion of said bottom constituting the remainder of the entire bottom area, and said outer portion being continued by an upstanding side wall, said tank being perforated about its periphery above said bottom area; a collecting trough surrounding said perforated portion to receive the slurry passing therethrough; a rotor plate closely overlying said bottom and having an upper surface openly facing the overlying region of the tank, said rotor plate covering substantially all of the area, and substantially only the area of said inner portion of the bottom; a series of combined tooth and vane members on said upper surface of said plate; generally-radially extending vane elements depending downwardly from said plate into close proximity to the underlying bottom of said tank; and means for rotating said plate to propel the slurry centrifugally outwardly in a swirling mass over the outer portion of the smooth bottom, against the upstanding side wall, upwardly along the side wall, across the perforated portion of the tank, through said perforated portion, and into said collecting trough.

2. A pulp shredder comprising: a tank having a smoothly dished bottom, the inner portion of said bottom having slight upward curvature, gradually continued by sharper upward curvature of a major outer portion of said bottom constituting the remainder of the entire bottom area, and said outer portion being continued by an upstanding side wall; a rotor plate closely overlying said bottom and having an upwardly convex generally dome shaped surface openly facing the overlying region of the tank, said rotor plate covering substantially all of the area, and substantially only the area of said inner portion of the bottom; a series of said combined tooth and vane members on said upper surface of said plate; and means for rotating said plate to propel the pulp centrifugally outwardly over the outer portion of the smooth bottom and against the upstanding side wall.

3. In a slurry forming device comprising a tank having a generally cylindrical upper section, an enlarged cup-shaped lower section of greater diameter than said upper section, and a perforated shoulder intermediate said upper and lower sections, and means to introduce liquid and solid material into said tank; a disintegrating impeller disc, means mounting said disc for rotation in said cup-shaped section, said disc comprising an upwardly convex working surface having upwardly projecting teeth for impinging against the solid material introduced into said tank to disintegrate the same, and generally radially extending vanes depending downwardly from said disc into close proximity to the adjacent wall of said cup-shaped section operable upon rotation of said disc to cause the liquid introduced into said tank to form a swirling mass of liquid having a central cavity overlying the toothed surface of the disc, the liquid carrying the solid material upwardly along the wall of said lower section and permitting it to fall directly onto the teeth of said disc for disintegration, and including a collecting trough surrounding said perforated section to receive the slurry passing through the perforations of said shoulder.

4. A device according to claim 3 wherein said means to introduce liquid and solid material into said tank includes liquid supply means to introduce liquid in an amount corresponding to the amount of slurry passing through said apertures.

5. A device according to claim 4 including a deliquifying unit connected to said collecting trough to receive the slurry and separate the liquid and solid material, and means to return the separated liquid to the liquid supply means.

6. A device according to claim 5 wherein said deliquifying unit comprises a generally cylindrical tubular screen tapering upwardly, a screw mounted for rotation interiorly of said screen in scraping engagement therewith, the pitch of said screw decreasing from the lower end toward the upper end thereof, means to introduce the slurry into the interior of said screen at the lower end thereof, whereby upon rotation of said screw the liquid is expelled through said screen, a casing for collecting the liquid expelled through said screen for return to said liquid supply means, and means affording discharge of the de-liquefied pulp from the interior of the screen at the upper end thereof, the liquid being expelled from the slurry to form said semi-dry pulp.

7. Apparatus according to claim 6 wherein said screw comprises a generally cylindrical shaft having a helically wound fin thereon, the outer diameter of which tapers in conformity with the taper on the tubular screen.

8. Apparatus according to claim 7 wherein the outer periphery of said fin is provided with radially projecting bristles in brushing engagement with said screen operable to clean the foraminations of said screen upon rotation of the screw therein.

9. In a slurry-forming device comprising a tank having an upper section, an enlarged cup-shaped lower section of greater diameter than said upper section, and a shoulder intermediate said sections, and means to introduce liquid and solid material into said tank; a disintegrating impeller disc, and means mounting said disc for rotation in said cup-shaped section with its upper surface below the level of said shoulder, said disc comprising an upwardly convex arcuate dome-shaped working surface having a radius of curvature approximately equal to the diameter of said disc with upwardly-projecting teeth for impinging against the solid material introduced into said tank to disintegrate the same, and generally-radially extending vanes depending downwardly from said disc into close proximity to the adjacent wall of said cup-shaped section operable upon rotation of said disc to cause the liquid introduced into said tank to form a swirling mass of liquid having a central cavity overlying the toothed surface of the disc whereby the liquid carries the solid material upwardly along the wall of said lower section and permits it to fall directly onto the teeth of said disc for disintegration.

10. A device according to claim 9 wherein said vanes are thin arcuate sections with their convex surface constituting the leading surface of the vane.

11. A device according to claim 9 wherein said lower section curves downwardly and inwardly from said shoulder to a low point disposed centrally under said disc, said vanes having an outline conforming to the curvature of said cup-shaped section to provide limited clearance between said vanes and said section.

(References on following page)

References Cited by the Examiner

UNITED STATES PATENTS

| | | | |
|---|---|---|---|
| 762,867 | 6/04 | Allen | 209—211 |
| 773,390 | 10/04 | Hencke | 100—112 X |
| 1,790,257 | 1/31 | Bakewell | 241—46 |
| 2,138,716 | 11/38 | Truitt | 241—278 |
| 2,289,612 | 7/42 | Wells | 92—26 X |
| 2,473,558 | 6/49 | Wuesnch | 241—46 X |
| 2,665,853 | 1/54 | Nicholson | 241—46 X |
| 2,709,956 | 6/55 | Napier | 100—72 |
| 2,737,372 | 3/56 | Carter | 241—46 X |
| 2,789,772 | 4/57 | Williamson | 241—46 |

FOREIGN PATENTS

| | | |
|---|---|---|
| 186,379 | 8/56 | Austria. |
| 535,037 | 1/22 | France. |
| 1,065,282 | 1/54 | France. |
| 722,820 | 2/55 | Great Britain. |
| 735,137 | 8/55 | Great Britain. |

J. SPENCER OVERHOLSER, *Primary Examiner.*

ROBERT A. O'LEARY, J. MICHAEL, *Examiners.*